United States Patent [19]

Schiessl

[11] Patent Number: 5,068,313

[45] Date of Patent: * Nov. 26, 1991

[54] PROCESS FOR MINIMIZING RESIDUAL FREE HYDRAZINE IN POLYMER LATICES

[75] Inventor: Henry W. Schiessl, Northford, Conn.

[73] Assignee: Olin Corporation, Cheshire, Conn.

[*] Notice: The portion of the term of this patent subsequent to Sep. 4, 2007 has been disclaimed.

[21] Appl. No.: 352,782

[22] Filed: May 16, 1989

[51] Int. Cl.$^5$ .............. C08F 6/10; C08F 6/16; C08F 6/24

[52] U.S. Cl. .................. 528/483; 524/566; 525/339; 528/486; 528/491; 528/492; 528/493; 528/496; 528/494

[58] Field of Search .......... 528/491, 483, 486, 492, 528/496, 493; 524/521, 566; 525/339; 564/464

[56] References Cited

U.S. PATENT DOCUMENTS

| | | | |
|---|---|---|---|
| 4,317,741 | 3/1982 | Lederle et al. | 564/464 |
| 4,452,950 | 6/1984 | Wideman | 525/339 |
| 4,532,318 | 6/1985 | Abubakari et al. | 528/483 |

Primary Examiner—Paul R. Michl
Assistant Examiner—Thomas McDonald, Jr.
Attorney, Agent, or Firm—Dale Lynn Carlson

[57] ABSTRACT

The present invention relates to a process for minimizing or reducing the amount of residual free hydrazine in polymer latices. The process is particularly useful in the manufacture of hydrogenated nitrile rubber which is resistant to oxidative degradation at high temperatures, as well as resistant to corrosive environments such as acid environments. Nitrile rubbers are useful in the manufacture of fan belts, seals, gaskets, and hoses in increasingly small and hot-running car engines.

11 Claims, No Drawings

PROCESS FOR MINIMIZING RESIDUAL FREE HYDRAZINE IN POLYMER LATICES

Various forms of hydrogenated nitrile rubbers have recently been introduced into the marketplace. Hydrogenated nitrile rubber has the advantage of being resistant to oxidative degradation at high temperature, as well as being resistant to corrosive environments such as acid environments. These materials have found utility in the manufacture of fan belts, seals, gaskets, and hoses in increasingly small and hot-running car engines.

One process for the production of hydrogenated polymers in latex form, particularly hydrogenated latex rubber, utilizes hydrazine and an unsaturated polymer as the starting materials This process is more particularly described in U.S. Pat. No. 4,452,950, assigned to the Goodyear Tire and Rubber Company However, the product produced in accordance with the process described in the '950 patent suffers from the disadvantage of containing residual unreacted hydrazine. This residual hydrazine is considered undesirable from an environmental and/or toxicity standpoint.

In view of the above, it would be highly desirable to provide a process for the elimination and/or reduction of the residual free hydrazine in the polymer product mixture.

In one aspect, the present invention relates to a process for reducing or eliminating free hydrazine from a mixture of hydrazine and polymer, wherein said polymer is in latex form, which comprises contacting said free hydrazine in said mixture with a hydrazine scavenger in order to bind said free hydrazine, thereby reducing or eliminating the presence of free hydrazine in said latex.

In another aspect, the present invention relates to a two-step process for reducing or eliminating hydrazine from a mixture of hydrazine and polymer, said polymer being in latex form, which comprises:

(a) contacting said hydrazine in said mixture with an oxygen-containing gas at an elevated pressure and a temperature of between about 20° C. and about 100° C. in the presence of a quinone or hydroquinone catalyst in order to effect a reaction of said hydrazine with said oxygen-containing gas in order to produce a purified mixture containing a reduced amount of free hydrazine, and (b) contacting said free hydrazine in said purified mixture with a hydrazine scavenger in order to bind at least a portion of said free hydrazine, thereby providing a desired mixture containing a reduced amount of free hydrazine.

These and other aspects of the present invention will become apparent upon reading the following detailed description of the invention.

The catalyst useful in the two-step process of the present invention is a quinone or hydroquinone catalyst. The catalyst is used in a "catalytically-effective amount", i.e. an amount sufficient to catalyze the destruction of at least some of the hydrazine in the polymer/hydrazine mixture by virtue of catalysis of a hydrazine reaction with the oxygen in the oxygen-containing gas. Although the preferred hydroquinone catalyst is quinone or hydroquinone itself, derivatives of hydroquinone can be used such as alkyl (preferably lower alkyl), carboxylic acid, or sulfonyl-substituted derivatives of quinone or hydroquinone. The catalyst is employed in a catalytically-effective amount, preferably between about 0.1 and about 1 percent based upon the total weight of latex.

The two-step process of the present invention employs an oxygen-containing gas. The oxygen-containing gas reacts with hydrazine to produce water and nitrogen The oxygen-containing gas is preferably air or oxygen, most preferably oxygen. The oxygen-containing gas is suitably employed in an amount of between about 100 to 300 percent excess, based on the total amount of hydrazine to be reacted.

The polymer/hydrazine mixture generally contains a major amount (i.e. typically greater than 70 weight percent) of water, saturated polymer (typically about 5 to about 25 weight percent), a minor amount of unsaturated polymer (typically between about one and five weight percent), and a minor amount (typically between about 0.1 and about 3 weight percent) of hydrazine, wherein the weight percents are based upon the total weight of the latex. For most applications, it is preferred that the amount of unsaturated polymer in the latex and the amount of hydrazine be minimized in the mixture. Reduction or elimination of the unsaturated polymer by conversion to saturated polymer is helpful in reducing the reactivity of the polymer latex. Reduction or elimination of the hydrazine in the mixture provides a mixture having reduced toxicity. The process of the present invention provides multiple advantages by both (a) reducing the amount of hydrazine in the mixture and (b) converting at least some of the unsaturated polymer to saturated polymer.

The hydrazine scavenger useful in the processes of the present invention acts to bind at least some portion of the free hydrazine in the purified latex. Useful hydrazine scavengers are compounds that react with hydrazine and include the following classes of compounds: isocyanates (such as tolylene diisocyanate, phenyl isocyanate and methylene diphenyl isocyanate (MDI)); alkylene oxides (such as ethylene oxide, propylene oxide, isobutylene oxide, styrene oxide, and polymeric epoxides); acrylates and methacrylates (such as methyl methacrylate); acrylonitrile, acrylic acids and methacrylic acids; ketones and diketones (such as acetyl acetone); aldehydes (such as benzaldehyd)); and combinations thereof. The preferred hydrazine scavenger is propylene oxide.

The hydrazine scavenger is employed in a "scavenging effective amount". As used herein, the term "scavenging effective amount" designates an amount of hydrazine scavenger sufficient to react with and bind at least some amount of the free hydrazine in the latex mixture. Preferably, the hydrazine scavenger is employed in an amount of between about 1 and about 10, more preferably between about 1 and about 5 times the theoretical molar amount required to react with the free hydrazine present in the hydrazine/latex mixture.

In a preferred embodiment of the present invention, step (a) of the two-step process is utilized to reduce the amount of hydrazine in the polymer/hydrazine mixture to a level of about 100 ppm or less, and then step (b) is employed to reduce the amount of free hydrazine in the mixture to 25 ppm or less.

As disclosed more fully in U.S. Pat. No. 4,452,950, incorporated herein by reference in its entirety, the polymer/hydrazine mixture in latex form is prepared by hydrogenation of unsaturated polymers. Prior to hydrogenation, the unsaturated polymers are typically composed of 5 to 100 percent by weight of a conjugated diene monomer unit and 95 to 0 percent by weight of an ethylenically-unsaturated monomer unit. Specific examples of the conjugated diene monomer are 1,3-butadiene, 2,3-dimethylbutadiene, isoprene, and 1,3-pentadiene, specific examples of the ethylenically unsaturated monomer include unsaturated nitriles such as acrylonitrile and methacrylonitrile, monovinyl aromatic hydrocarbons such as styrene, (o-, m-, and p-) alkylstyrenes, divinyl aromatic such as divinylbenzene, dialkenyl aromatics such as diisopropenylbenzene, unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate.

The conjugated diene polymer may be one prepared by any method of preparation, such as emulsion polymerization, solution polymerization or bulk polymerization. Specific examples of the conjugated diene polymer include polyisoprene, polybutadiene, a styrene/butadiene (random or block) copolymer, an acrylonitrile-butadiene (random or blocked) copolymer, a butadiene/isoprene copolymer, and an isoprene/isobutylene copolymer.

When employing the two-step process of the present invention, wherein step (a) utilizes an oxygen-containing gas to remove hydrazine from the latex mixture, step (a) is suitably effected at an elevated pressure. The elevated pressure is preferably between about 20 and about 700 psig, more preferably between about 30 and about 200 psig, most preferably between about 30 and about 100 psig. The process is suitably effected at a temperature of between about 20° C. and about 100° C., more preferably between about 20° C. and about 50° C. The reaction time for the process of the present invention can vary over a wide range, but is preferably between about 1 hour and about 50 hours, more preferably between about 1 hour and about 25 hours, most preferably between about 1 hour and about 20 hours.

The following examples are intended to illustrate, but in no way limit the scope of, the present invention.

EXAMPLE 1

An acrylonitrile/butadiene rubber with 66.2 weight percent butadiene and an average molecular weight of about 200,000 was hydrogenated in latex form with a approximately as described in Wideman, without a metal ion initiator After achieving about 91 percent conversion of the C=C double bonds, the run was interrupted. At this point in the reaction, the latex contained 3.76 weight percent unreacted hydrazine, based on the weight of the aqueous phase of the latex. This latex was placed in a pressure vessel, along with ca 0.2 weight percent hydroquinone as catalyst, the vessel flushed with pure oxygen several times and then pressured with pure oxygen to about 40 psig and allowed to react at the autogenous temperature, which generally was between 20° and 40° C. This operation of flushing and filling the pressure reactor was repeated several times in order to provide sufficient oxygen for the reaction with hydrazine. The final hydrazine concentration after this oxygen treatment was about 100 ppm, based on the total weight of latex. The total time of treatment was about 20 hours under pressure.

To a portion of the above latex, a molar excess of toluene diisocyanate (TDI) (relative to the hydrazine present) was added at room temperature and stirred for two hours. The final free hydrazine content was about 50 ppm, based on the total weight of the latex.

EXAMPLE 2

To another portion of the hydrogenated latex as prepared in Example 1, an excess of propylene oxide was added at room temperature and stirred for two hours. Again the final free hydrazine content was about 50 ppm, based on the total weight of the latex.

EXAMPLE 3

A latex sample was prepared substantially as per Example 1, up to and including the pressurized oxygen step. The conversion of the C=C bonds was about 90 percent complete at the end of the reaction and the hydrazine level in the aqueous phase of the latex was treated with an excess of propylene oxide, stirred for one hour at room temperature and then for an additional hour at 80°–85° C. The final level of free hydrazine in the aqueous phase of the latex was 17 ppm hydrazine.

EXAMPLE 4

An acrylonitrile/butadiene rubber with 66.2 weight percent butadiene and an average molecular weight of about 200,000 was hydrogenated in latex form with a mixture of hydrazine and hydrogen peroxide in a manner approximately as described in Wideman, without a metal ion initiator. After achieving about 88 percent conversion of the C=C double bonds, the run was interrupted. At this point in the reaction, the latex contained 4.05 weight percent unreacted hydrazine, based on the weight of the aqueous phase of the latex.

To a portion of this hydrogenated latex was added an excess of methyl acrylate and stirred at room temperature for 1.5 hours. During this period, there was a noticeable exotherm. The final hydrazine content was about 473 ppm, based on the weight of the aqueous phase of the latex, which represents about a 99 percent removal of hydrazine from the latex.

What is claimed is:

1. A two-step process for reducing or eliminating hydrazine from a mixture of hydrazine and polymer, said polymer being in latex form, which comprises:
   (a) contacting said hydrazine in said mixture with an oxygen-containing gas which is air or oxygen at an elevated pressure and a temperature of between about 20° C. and about 100° C. in the presence of a quinone or hydroquinone catalyst in order to effect a reaction of said hydrazine with said oxygen-containing gas in order to produce a purified mixture containing a reduced amount of free hydrazine, and
   (b) contacting said free hydrazine in said purified mixture with a hydrazine scavenger in order to bind at least a portion of said free hydrazine, thereby providing a desired mixture containing a reduced amount of free hydrazine therein.

2. The process of claim 1 wherein said hydrazine scavenger is employed in a scavenging effective amount.

3. The process of claim 1 wherein said hydrazine scavenger is employed in an amount of between 1 and 10 times the number of moles of hydrazine present in said mixture.

4. The process of claim 1 wherein said hydrazine scavenger is selected from the group consisting of isocyanates, alkylene oxides, acrylates, methacrylates, acrylic acids, acrylonitrile, methacrylic acids, ketones, diketones, aldehydes, and combinations thereof.

5. The process of claim 1 wherein the hydrazine scavenger is propylene oxide.

6. The process of claim 1 wherein said pressure is between about 20 and about 700 psig.

7. The process of claim 1 wherein said between about 30 psig and about 200 psig.

8. The process of claim 1 wherein said pressure is between about 30 psig and about 100 psig.

9. The process of claim 1 wherein said temperature is between about 20° C. and about 100° C.

10. The process of claim 1 wherein said temperature is between about 20° C. and about 50° C.

11. The process of claim 1 wherein said reaction is conducted for a reaction time of between about 1 hour and about 50 hours.

* * * * *

UNITED STATES PATENT AND TRADEMARK OFFICE
CERTIFICATE OF CORRECTION

PATENT NO. : 5,068,313

DATED : November 26, 1991

INVENTOR(S) : Henry W. Schiessl

It is certified that error appears in the above-identified patent and that said Letters Patent is hereby corrected as shown below:

Column 2, line 43, delete "benzaldehyd)" and insert ---benzaldehyde--- in its place.

At column 3, line 45, after "with a" please insert ---mixture of hydrazine and hydrogen peroxide in a manner---.

At column 5, line 5, after "said" please insert ---pressure---.

Signed and Sealed this

Twentieth Day of April, 1993

Attest:

MICHAEL K. KIRK

*Attesting Officer*     Acting Commissioner of Patents and Trademarks